United States Patent [19]

James

[11] Patent Number: 5,199,682

[45] Date of Patent: Apr. 6, 1993

[54] FISHING REEL WITH ANNUAL RATCHET CLUTCH EXTERNAL THE SPOOL

[76] Inventor: Scott James, 15 Kearny Ave., Apt. #3B, Edison, N.J. 08817

[21] Appl. No.: 709,357

[22] Filed: Jun. 3, 1991

[51] Int. Cl.⁵ .................... A01K 89/033; F16D 63/00
[52] U.S. Cl. ................................ 242/295; 242/317; 188/82.1
[58] Field of Search ............... 242/257, 279, 295, 303, 242/317, 297, 298; 464/38; 188/82.1, 82.5, 82.9

[56] References Cited

U.S. PATENT DOCUMENTS

| | | | |
|---|---|---|---|
| 1,126,219 | 1/1915 | Hupp | 464/38 |
| 1,980,345 | 11/1934 | Long et al. | 242/298 X |
| 2,130,671 | 9/1938 | Maynes | 242/303 X |
| 2,269,808 | 1/1942 | Cabassa | 242/266 |
| 2,591,204 | 4/1952 | Schnepel | 242/257 X |
| 2,641,419 | 6/1953 | Cowen et al. | 188/82.9 |
| 2,686,016 | 8/1954 | Kilian | 242/317 |
| 3,432,114 | 3/1969 | Meisner | 242/256 |
| 3,510,083 | 5/1970 | Cook | 242/295 |
| 3,697,012 | 10/1972 | Walker | 242/303 X |
| 3,958,771 | 5/1976 | Everett et al. | 242/303 |
| 4,062,203 | 12/1977 | Leonard et al. | 464/38 |
| 4,544,114 | 10/1985 | Stauffer | 242/270 |
| 4,570,878 | 2/1986 | Nakajima | 242/307 X |
| 4,715,555 | 12/1987 | McChristian, Jr. | 242/317 X |

*Primary Examiner*—Daniel P. Stodola
*Assistant Examiner*—Michael R. Mansen
*Attorney, Agent, or Firm*—Omri M. Behr; Matthew J. McDonald

[57] ABSTRACT

A fishing reel has a frame assembly with an inwardly directed, frame teeth arrangement. The reel also has a spindle rotatably mounted on the frame assembly coaxially with the frame teeth arrangement. Also included is a spool having at least one flange and a cylindrical core rotatably mounted on the spindle. The spindle comprises a clutch disk having near its periphery an annular row of axially projecting disk teeth arranged to ratchet with the frame teeth arrangement. The annular row of disk teeth being positioned to the outside of the cylindrical core of the spool. The spindle also includes a brake pad mounted between the clutch disk and the spool for frictionally engaging and resisting relative motion between them.

20 Claims, 2 Drawing Sheets

FISHING REEL WITH ANNUAL RATCHET CLUTCH EXTERNAL THE SPOOL

BACKGROUND OF THE INVENTION

The present invention relates to fishing reels, and in particular, to reels having a drag brake and a ratchet mechanism for allowing unidirectional rotation of a spool.

When a fish strikes a fly, a lure, or other bait, line tension may become excessive and threaten to break the fishing line. Conventional fly casting reels often have a drag brake for this reason. The drag brake will respond to excessive line tension by allowing the spool in the reel to slip on its supporting axis. The slippage will occur without regard to the position or motion of any crank that may normally be used to retrieve the line.

Known reels often include a one way clutch to allow winding but not unwinding of the spool. Unwinding slack line will only tangle it. An angler can unwind line by overcoming the drag brake and pulling a large slack segment from the reel. This excess line is normally held to the side and released during the casting motion.

A disadvantage with known fishing reels is the rather complicated mechanisms employed to provide drag and one way rotation. The mechanism of U.S. Pat. No. 2,686,016 provides a drag brake as well as a clutch and a ratchet wheel. The large number of moving parts makes the reel relatively large, heavy and inconvenient for fly casting. For example, a gear train is employed so that the hand crank is at a different axial position than the spool. In particular, the amount of space occupied by the mechanism on a side of the spool is almost as large as the axial space provided for the fishing line itself.

Other fishing reels have attempted to reduce the amount of space occupied by the reel mechanism by mounting a clutch inside the core of the spool. See for example U.S. Pat. Nos. 2,130,671 and 3,432,114. In reels of this type, the clutch can be a pair of opposing rings with rows of ratchet teeth axially facing each other. Winding torque can be applied to a spool because the clutch slips as opposing teeth slide over each other and ratchet. Reverse rotation causes the teeth to lock and prevents unwinding. A disadvantage with these types of reels is that the clutch mechanism must be relatively small to fit within the core of the spool. Consequently the teeth are packed within a small diameter and must sustain a relatively high load. Thus the clutch is noisy, tends to wear quickly, and has a rough feel. See also U.S. Pat. Nos. 2,269,808 and 4,570,878.

Accordingly, there is a need for a smoothly and quietly operating fishing reel with a drag and clutch mechanism that is compact and not prone to high wear.

SUMMARY OF THE INVENTION

In accordance with the illustrative embodiments demonstrating features and advantages of the present invention, there is provided a fishing reel having a frame assembly with an inwardly directed frame teeth arrangement. The reel also has a spindle rotatably mounted on the frame assembly coaxially with the frame teeth arrangement. Also included is a spool having at least one flange and a cylindrical core rotatably mounted on the spindle. The spindle includes a clutch disk having near its periphery an annular row of axially projecting disk teeth arranged to ratchet with the frame teeth arrangement. This annular row of disk teeth is positioned to the outside of the cylindrical core of the spool. The spindle also includes a brake pad mounted between the clutch disk and the spool for frictionally engaging and resisting relative motion between them.

By employing such apparatus, a relatively compact reel is achieved that smoothly operates without excessive wear or noise. In a preferred embodiment, a frame has a narrow cylindrical post passing through an axially moveable, toothed plate. The plate is slidably mounted on several axially extending stanchions and is resiliently urged in the axial direction by a plurality of compression springs each encircling a corresponding stanchion. Mounted in axial facing opposition to the toothed plate is a preferred tubular spindle having on one end a clutch disk with teeth that engage the teeth of the toothed plate. The teeth are arranged such that the spindle can turn in only one direction. Preferably, a brake pad is mounted around the spindle between the clutch disk and a bored spool carrying a fishing line. A cap threaded on the spindle can push curved washers against a shoulder inside the bore of the spool to regulate the force on the brake pad between the spool and the clutch disk.

The brake pad and clutch disk can be made relatively flat so that the device is compact. The diameter of the clutch can be made sufficiently large so that the reel can operate smoothly, quietly and with little wear. Preferably, the components including the crank, spool, spindle and clutch disk, are arranged to conserve space.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
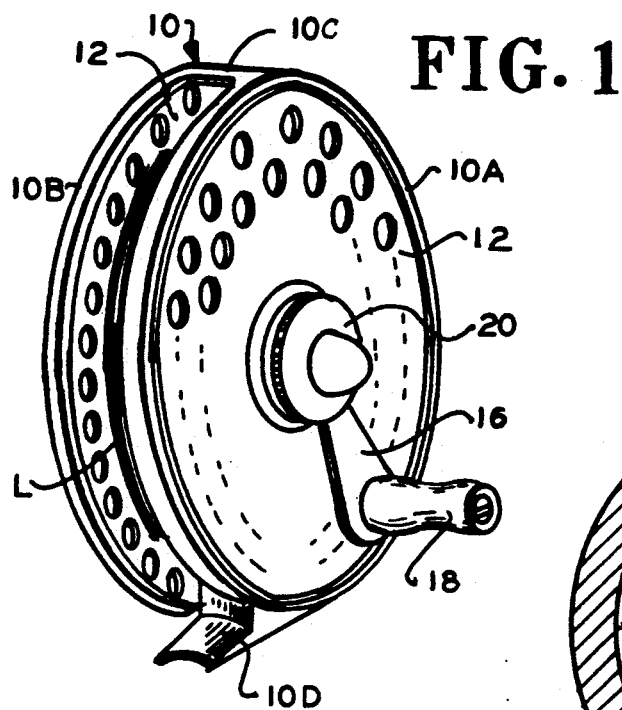
FIG. 1 is perspective view of a fishing reel in accordance with the principles of the present invention.

Referring to FIG. 1, a fishing reel is illustrated with a frame assembly 10 having a right hoop 10A and a circular plate 10B, the latter being made foraminate to reduce weight. The radial outer peripheral region of frame assembly 10 has a bridge 10C joining hoop 10A and plate 10B. The radial outer peripheral region of frame assembly 10 has a mounting foot 10D connected to and between hoop 10A and plate 10B. Foot 10D has extensions for mounting the reel onto a rod (not shown) in a conventional fashion.

A spool 12 is shown having a pair of foraminous flanges bordering a core (illustrated hereinafter), which is wound with fishing line L. As explained hereinafter in further detail, crank 16 can be rotated using handle 18 to wind line L onto spool 12. Crank 16 is a flat plate having coaxial with spool 12 a round hole with one or more flattened edges (not shown) to lock crank 16 relative to spool 12. The outer end of crank 16 has a hole for rotatably supporting wooden handle 18, as illustrated.

Figure 2:
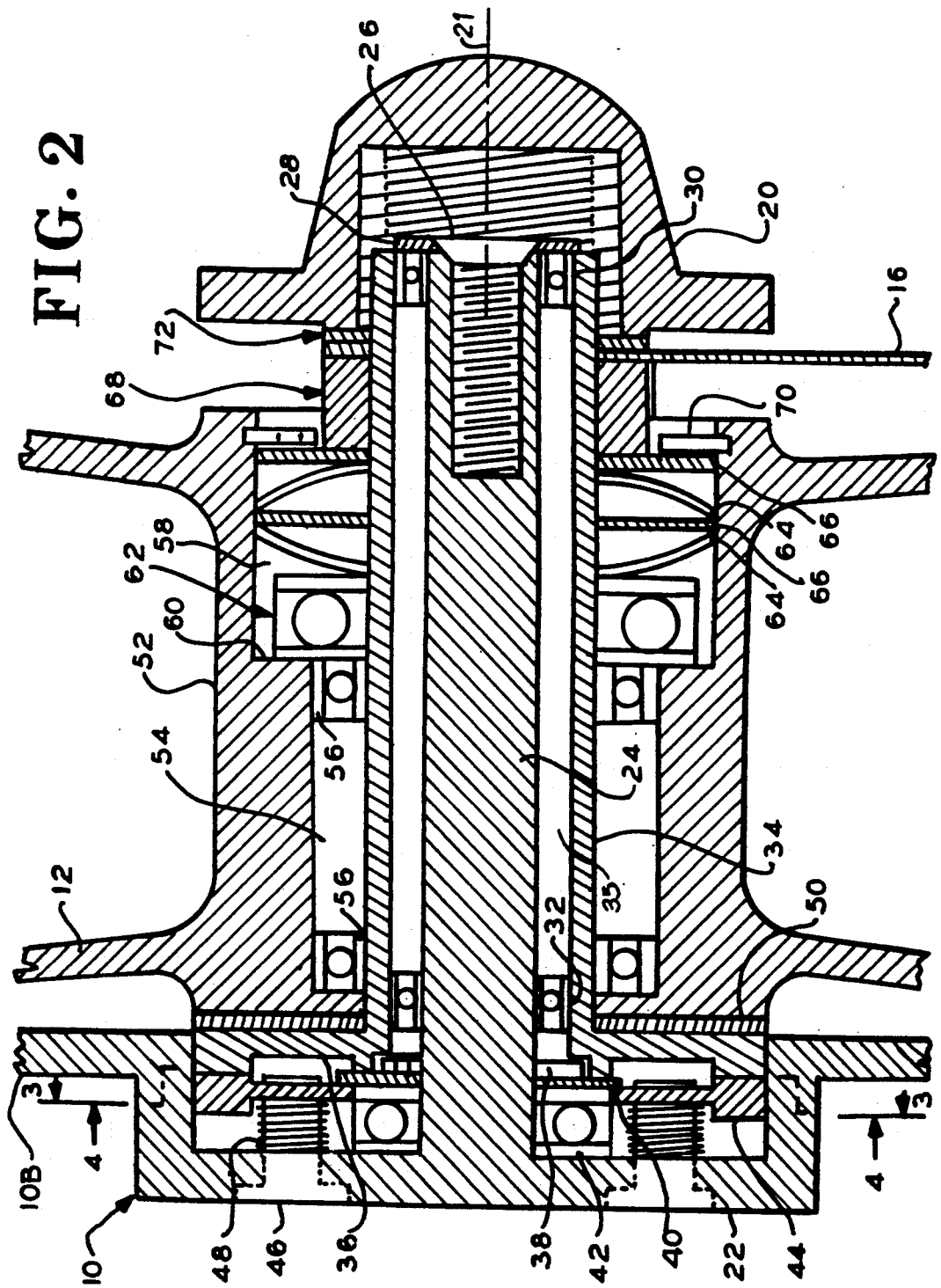
FIG. 2 is an axial sectional view of the reel of FIG. 1.

Referring to FIG. 2, previously illustrated frame 10 has a rear cylindrical compartment 22 with an inwardly axially projecting cylindrical post 24 concentric about axis 21. The end of post 24 is bored and threaded to receive screw 26, which holds washer 28 in place over bearing 30. Bearing 30 and bearing 32 are snugly fitted into spindle 34 to rotatably support spindle 34 on post 24 relative to axis 21. Spindle 34 is an axially extending cylindrical sleeve having on its left end (this view) a clutch disk 36, described hereinafter in further detail. A retainer ring 38 encircles post 24 to the left of clutch plate 36. To the outside of ring 38 is an annular retainer 40, which bears against thrust bearing 42. Thrust bearing 42 encircles post 24 and bears against the floor of compartment 22.

A frame teeth arrangement is shown herein as toothed plate 44, described hereinafter in further detail. Plate 44 encompasses the interior most end of thrust bearing 42. Also, toothed plate 44 has three equiangularly spaced guide holes in which stanchions 46 are mounted. Stanchions 46 are illustrated herein as nail-like articles that are pressed fitted into apertures in the floor of compartment 22. A float means is shown herein as compression springs 48, each of which encircle a corresponding one of stanchions 46 and bear against a face of toothed plate 44 and the floor of compartment 22. As thus mounted, toothed plate 44 tends to float i.e., is axially displaceable, and is resiliently urged against clutch disk 36.

It will be noted that disk 36 and plate 44 have an outside diameter, which is greater than the outside diameter of the core 52 of spool 12. This is important. The core outside diameter is measured between the flanges at a representative axial midpoint on the core. By allowing the clutch disk 36 and plate 44 to have a relatively large diameter, the forces on the disk teeth can be moderated i.e., reduced, and the clutch can work smoothly and without excessive noise or wear.

Previously illustrated spool 12 has a generally cylindrical, hollow core 52 supporting the illustrated spool flanges. Brake pad 50 is an annular leather disk mounted flushed between the right face of clutch disk 36 and the left face of core 52. Core 52 has an axially extending compartment 54 containing bearings 56 for rotatably supporting spool 12 on the sleeve of spindle 34. A second, outer compartment 58 has an internal shoulder 60. Bearing 62 is pressed into compartment 58 by a thrust means, shown herein as curved washers 64. Washers 64 can be hemispherical or saddle shaped washers such as Belleville washers. Flat washers 66 alternate with washers 64. Annular plunger 68 encircles spindle sleeve 34 and acts as a plunger to bear against the washers 64 and 66. Washers 64 allow a certain amount of give so that axial forces can be resiliently transmitted to shoulder 60 to drive spool 12 towards brake pad 50. Washers 64 and 66 are held in place by a conventional snap ring 70, fitted within an internal groove on spool 12. Previously illustrated crank 16 is shown mounted against plunger 68 with washer 72 mounted between the crank and cap 20.

Figure 3:
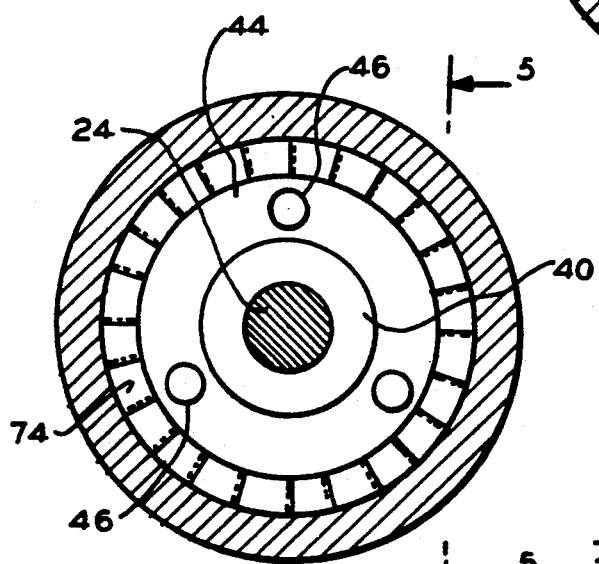
FIG. 3 is a cross sectional view taken along lines 3—3 of FIG. 2.
Figure 5:
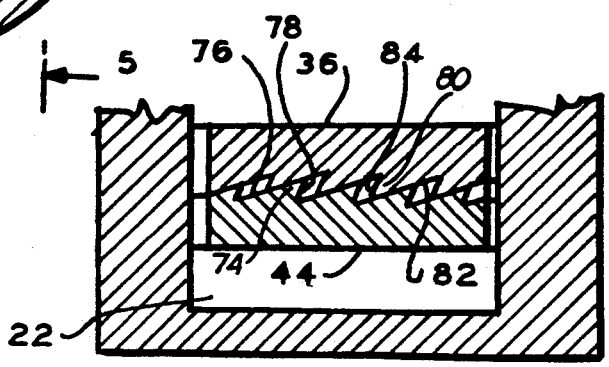
FIG. 5 is a fragmented diagrammatic exaggerated sectional view taken along lines 5—5 of FIG. 3 for illustrating the ratchet teeth relationship.

Referring to FIGS. 3 and 5, previously illustrated toothed plate 44 is shown mounted around post 24 and retainer 40. Stanchions 46 project into guide holes in plate 44. Mounted on the inside face near the periphery of plate 44 are an annular array of frame teeth 74. Teeth 74 each have a leading face 76 and an undercut and relatively steep trailing face 78. In FIG. 5, the scale is exaggerated for purposes of illustration.

Figure 4:
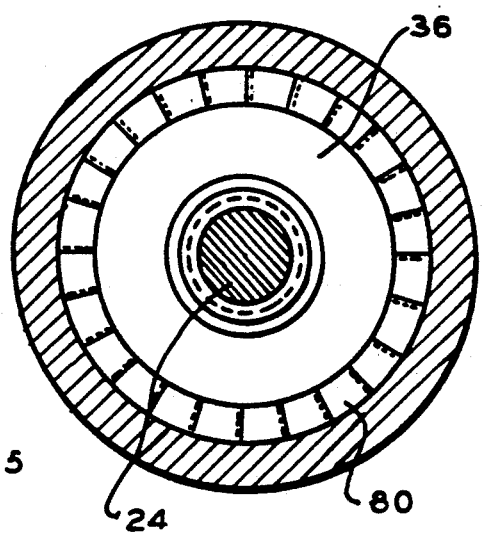
FIG. 4 is a cross sectional view taken along lines 4—4 of FIG. 2.

Referring to FIGS. 4 and 5, clutch disk 36 is mounted around post 24. Disk 36 has an annular array of disk teeth 80. Disk teeth 80 have a leading face 82 and a relatively steep, undercut face 84. As shown in FIG. 5, the teeth of disk 36 and plate 44 are shown partially disengaged. Disk 36 is shifted to the right (this view) relative to plate 44 by about one half the tooth pitch. Accordingly disk 36 can continue to move to the right, by pushing resiliently floating plate 44 downwardly to provide clearance for the teeth of disk 36. If, however, disk 36 moves to the left, the teeth lock and further rotation is not possible.

To facilitate an understanding of the principles associated with the foregoing apparatus, its operation will now be briefly described. End cap 20 can be tightened and loosened to increase and decrease respectively, the drag on spool 12. Tightening cap 20 axially displaces i.e, thrusts the plunger 68 (FIG. 2) against washers 64 and 66, thereby increasing the pressure between the inside face of clutch disk 36 and the opposing face of spool 12 via pad 50. If the drag is reduced sufficiently, line can be pulled from spool 12, causing spool 12 to rotate and slip, despite brake pad 50. In the usual fashion, extra line can be held to the side by the angler, who then can cast the excess line in the usual fashion.

Next, the angler can rotate crank 16 in a winding direction, turning spindle 34. As spindle 34 turns, the teeth 74 of clutch disk 36 ratchet over the teeth 80 of floating plate 44. As floating plate 44 ratchet, it is displaced along stanchions 46 to compress springs 48. Should the angler attempt to rotate crank 16 in the opposite direction to unwind line, the teeth on disk 36 and plate 44 will lock to prevent further rotation of the crank. This feature is referred to as "anti reverse," (as opposed to a direct drive where the crank attaches directly to the spool). Note that when the crank itself is locked, line tension applied to spool 12 can still cause slippage through the brake.

It is to be appreciated that various modifications may be implemented with respect to the above described preferred embodiments. For example, the various components can be made of steel, or cast aluminium, although other metals, plastics and other suitable materials can be chosen depending upon the desired strength, weight and structural rigidity. Also, the various dimensions illustrated herein can be varied depending upon the amount of line to be stored, the desired strength etc. Furthermore, while ball bearings are illustrated in some embodiments, other types of bearings can be used instead. Also, the illustrated floating plate can in some embodiments, be floated with various types of springs or other resilient materials or mechanisms. Furthermore, the illustrated teeth can be increased or reduced in number and can have a pitch and angle appropriate for the specific design. Moreover, the various components illustrated herein can be placed at alternative positions depending upon the design requirements.

Obviously many modifications and variations of the present invention are possible in light of the above teachings. It is therefore to be understood that within the scope of the appended claims, the invention may be practiced otherwise than as specifically described.

By placing the ratchet external the spindle and spool, the diameter of the array teeth can be made greater than the diameters of the spindle and spool. By increasing the diameter of the array of teeth, more teeth may be utilized as compared to a smaller diameter array for a given tooth size. This permits the axial force load on the individual teeth to be reduced, reducing relative wear since frictional loads are a function of normal forces on a surface. Since the wear is reduces the depth of the teeth can be made shallower than otherwise possible thereby reducing noise and roughness during the ratcheting action. Because of the undercut relation of the ratchet teeth, relatively low spring force in the axial direction is required to lock the teeth together further reducing wear.

I claim:

1. A fishing reel comprising:
   a frame assembly defining an axis and including a frame teeth arrangement facing in an axial direction;
   a spindle rotatably mounted on said frame assembly coaxially with said frame teeth arrangement: and
   a spool having at least one flange and a cylindrical core rotatably mounted on said spindle, said spindle comprising:
   (a) a clutch disk having near its periphery an annular array of axially projecting disk teeth arranged so that each disk tooth rotates relative to and against a plurality of teeth of said frame teeth arrangement, said annular array of disk teeth being external said spool core; and
   (b) a brake pad mounted between said clutch disk and said spool for frictionally engaging and resisting relative motion therebetween.

2. A fishing reel according to claim 1 wherein said frame teeth arrangement comprises:
   a toothed plate mounted to axially displace relative to said clutch disk.

3. A fishing reel according to claim 2 wherein said frame teeth arrangement further comprises:
   float means for urging said toothed plate against said clutch disk.

4. A fishing reel according to claim 3 wherein said toothed plate has a plurality of guide holes and wherein said frame teeth arrangement further comprises:
   a parallel plurality of spaced stanchions mounted on said frame assembly and in said guide holes to guide said toothed plate.

5. A fishing reel according to claim 4 wherein said float means comprises:
   a plurality of compression springs mounted around corresponding ones of said stanchions on the side of said toothed plate distal to said spindle.

6. A fishing reel according to claim 3 wherein said toothed plate has peripheral frame teeth, each of said frame teeth having a leading face and a relatively steep trailing face.

7. A fishing reel according to claim 6 wherein said trailing face is undercut such that a root of each tooth is closer to the other root of that than the projection of the crest in a direction normal to a line connecting the roots.

8. A fishing reel according to claim 1 further comprising:
   a crank attached to said spindle for manually rotating the spindle.

9. A fishing reel according to claim 8 wherein said crank is mounted coaxially with and on said spindle at a spindle end opposite said clutch disk, said spool being between said crank and said clutch disk.

10. A fishing reel according to claim 9 wherein said frame assembly has a post, said spindle being rotatably mounted on said post.

11. A fishing reel according to claim 10 further comprising:
    thrust means coaxially mounted with and around said spindle and arranged to yieldably engage said spool; and
    a cap threaded on an end of said spindle distal said clutch disk to thrust against said thrust means so that said brake pad is compressed between the spool and said clutch disk.

12. A fishing reel according to claim 11 wherein said spool has a bore coaxial with said spindle and includes an internal shoulder, said thrust means being mounted in said bore to bear against said shoulder.

13. A fishing reel according to claim 12 wherein said frame teeth arrangement comprises:
    a toothed plate mounted to displace axially relative to said clutch disk.

14. A fishing reel according to claim 13 wherein said frame teeth arrangement further comprises:
    float means for urging said toothed plate against said clutch disk.

15. A fishing reel according to claim 14 wherein said toothed plate has a plurality of guide holes and wherein said frame teeth arrangement further comprises:
    a parallel plurality of spaced stanchions mounted on said frame assembly and in said guide holes to guide said toothed plate.

16. A fishing reel comprising:
    a member having an axially extending post;
    a plate including a first annular array of ratchet teeth facing in the axial direction away from said member, said post passing through the plate;
    a spindle having first and second ends and rotatably secured to the post for rotation about an axis defined by the post, said spindle including at the first end a disk having a second annular array of ratchet teeth mating with and axially engaged with the first array, said first and second arrays of teeth being arranged to lock when rotated in one relative direction and slip when rotated in an opposite relative direction so that each of a plurality of teeth of the first array displace against a plurality of teeth of the second array.

17. The fishing reel according to claim 16 wherein the first and second arrays of teeth have a diameter greater than that of the spindle.

18. The fishing reel according to claim 16 wherein the first and second arrays of teeth have a minimum diameter relative to said axis greater than that of the spool.

19. The fishing reel according to claim 16 wherein said means for resiliently urging comprises an annular array of spaced compression springs between the member and the plate.

20. The fishing reel of claim 16 wherein said means for providing an adjustable axial force includes a cap threaded to said spindle and spring means coupled between said cap and said spool.

* * * * *